United States Patent
Jha et al.

[19]

[11] Patent Number: 6,080,219
[45] Date of Patent: Jun. 27, 2000

[54] COMPOSITE POROUS MEDIA

[75] Inventors: Sunil C. Jha, Simsbury; Kenneth L. Rubow, Farmington; Cathy L. Cowan, Canton; Mark R. Eisenmann, Burlington, all of Conn.

[73] Assignee: Mott Metallurgical Corporation, Farmington, Conn.

[21] Appl. No.: 09/074,957

[22] Filed: May 8, 1998

[51] Int. Cl.[7] .............................. B01D 39/20; C22C 1/08
[52] U.S. Cl. ............................ 55/486; 55/523; 210/496; 210/510.1
[58] Field of Search ..................... 55/486, 487, 523; 210/496, 510.1; 419/2

[56] References Cited

U.S. PATENT DOCUMENTS

| | | | |
|---|---|---|---|
| 3,874,899 | 4/1975 | Miszenti et al. | 55/523 |
| 4,039,703 | 8/1977 | Kamijo et al. | 419/2 |
| 4,186,100 | 1/1980 | Mott | 210/496 |
| 4,283,465 | 8/1981 | Morimoto et al. | 419/2 |
| 4,569,821 | 2/1986 | Duperray et al. | 419/2 |
| 4,613,369 | 9/1986 | Koehler | 419/2 |
| 4,746,341 | 5/1988 | Komoda | 55/487 |
| 4,888,114 | 12/1989 | Gaddis et al. | 55/523 |
| 4,976,760 | 12/1990 | Helferich et al. | 55/487 |
| 5,089,134 | 2/1992 | Ando et al. | 55/487 |
| 5,279,737 | 1/1994 | Sekhar et al. | 210/496 |
| 5,364,586 | 11/1994 | Trusov et al. | 419/2 |
| 5,449,654 | 9/1995 | Prin et al. | 55/523 |
| 5,486,220 | 1/1996 | Honda et al. | 55/487 |
| 5,824,220 | 10/1998 | Grangeon et al. | 55/523 |
| 5,839,049 | 11/1998 | Ettel et al. | 419/2 |
| 5,881,353 | 3/1999 | Kamigata et al. | 419/2 |

Primary Examiner—Duane S. Smith
Attorney, Agent, or Firm—Hale and Dorr LLP

[57] ABSTRACT

A composite porous media for either gas or liquid flow is strong and efficient, and can readily be formed in or into a wide range of different shapes and configurations. In particular, the porous media is a composite of a metal, aerogel or ceramic foam (i.e., a reticulated inter-cellular structure in which the interior cells are interconnected to provide a multiplicity of pores passing through the volume of the structure, the walls of the cells themselves being substantially continuous and non-porous, and the volume of the cells relative to that of the material forming the cell walls being such that the overall density of the intercellular structure is less than about 30 percent theoretical density) the through pores of which are impregnated with a sintered powder or aerogel. The thickness, density, porosity and porous characteristics of the final composite porous media can be varied to conform with what is demanded by the intended use.

12 Claims, 5 Drawing Sheets

COMPOSITE POROUS MEDIA

FIELD OF THE INVENTION

This invention relates to composite porous media and, more particularly, to composite porous media for filtering gases and liquids.

BACKGROUND OF THE INVENTION

Porous media are used in a wide range of industrial applications for filtering and dispersing gases and liquids. Typical examples of such uses include particle capture, flow restriction, sound attenuating, gas/liquid contacting, wicks, spargers, and atomizers. In the electronics industry, high efficiency filters are widely used to remove small particles from a variety of process streams. Sintered metal filters useful for this purpose and capable of removing more than 99.9999999% of particles having the most penetrating particle size, e.g., about 0.1 micrometer, from a process gas flow (i.e., having a log reduction value or "LRV" greater than 9) are illustrated in U.S. Pat. Nos. 5,114,447 and 5,487,771, and in co-pending applications Ser. Nos. 08/895,604 and 08/895,605, now U.S. Pat. Nos. 5,937,263 and 5,917,066, all of which are here incorporated by reference. A wide range of sintered metal media for use in the these various fields and applications, including high efficiently filters for the electronics industry, are available commercially from Mott Corporation, the assignee of this patent. Sintered porous ceramic media and polymeric membrane filters are also available commercially.

As described in the above referenced patents and applications, and as is well-known in the art, porous metal media are typically made by pressing or molding metal or metal-alloy powders of specified characteristics into a desired shape, e.g., a sheet, tube or cup. The shaped body is then sintered at high temperature to provide a porous element or media. Sintered porous ceramic media are made by similar known procedures.

The exact characteristics of a porous metal or other media are highly dependent on a number of factors, including the particular powder used, the green density, the sintering conditions employed, and the configuration of the media. Depending on the application, important physical characteristics of the media may include its resistance to corrosion (e.g., from reaction with a wide range of process gases and liquids), mechanical strength, and the ability to withstand high temperatures. A filter, for example, should provide a relatively high rate of fluid flow at minimum pressure drop, and must be capable of removing any particulate matter that could cause contamination in the downstream manufacturing process.

As is known in the art, sintered powder metal media are generally capable of providing the desired corrosion and high temperature resistance. However, and as also is well-known, the relatively high porosity needed to provide the desired flow at a low pressure drop often comes at the cost of low mechanical strength and a decrease in efficiency. The lack of strength of conventional porous media is most serious in the "green" form; poor handleability of "green" porous structures is a major concern in manufacturing procedures particularly for large dimension tubes and sheets.

Fine filamentary nickel powders, such as those produced by the carbonyl nickel process and sold by INCO, are being used commercially to create fine porous media. However, the "green" shapes made from these fine powders are relatively weak, and this is particularly so when the powders are more spherical than filamentary in shape. Moreover, fine powders have a high surface area and are highly active during the sintering process; thus, 10% to 15% shrinkage of the molded "green" shapes occurs when they are sintered at 1300– 1700 degrees F., in either a protective atmosphere (such as hydrogen) or in vacuum, is common. Additionally, because these powders are typically sintered at low temperatures (e.g., 1300 deg. F.) and for relatively short times (e.g., 10 to 15 minutes) to maintain high porosity, even the final sintered structure is relatively weak since both the time and the temperature are less than that necessary to form strong sintered bonds. Thus, although such porous media are satisfactory for relatively small structures, severe limitations in the processing and mechanical properties of porous sintered metal structures have made it difficult to make larger structures, such as large sheets, continuous strips or tubes of substantial diameter or length. Porous ceramic media having pore sizes of the same order of magnitude as those of sintered metal powder filters have been made using fine oxide particles, e.g., of 1 to 5 micrometer size, but these ceramic elements tend to be considerable more dense, e.g., to have 55% to 75% of theoretical density.

There remains a need for a porous media having the highly desirable flow, heat and corrosion resistance characteristics of the best sintered powdered metal or ceramic media, but that is stronger, can be formed into larger structures, and that can provide greater overall flow at a low pressure drop. There is a particular need for structures which have a high "green strength", to facilitate handling and transfer during the manufacturing process.

SUMMARY OF THE INVENTION

The present invention provides a composite porous media that can be used for either gas or liquid flow, that is strong (both in its final and green form) and efficient, and that can readily be formed in or into a wide range of different shapes and configurations. In particular, the invention features a porous media that is a composite of a metal, ceramic or other open-pore foam (i.e., a reticulated, inter-cellular structure in which the interior cells are interconnected to provide a multiplicity of pores passing through the volume of the structure, the walls of the cells themselves being substantially continuous and non-porous, and the volume of the cells relative to that of the material forming the cell walls being, such that the overall density of the reticulated cellular structure is less than about 30 or 35 percent theoretical density) and sintered powder in the pores of the foam. The thickness, density, porosity and filtration characteristics of the final composite porous media can be varied to conform with what is required by the intended use. Typically the size of the pores formed by the foam is in the range of a few hundred to a few thousand micrometers, while the sintered powder in the foam pores is much smaller than, and forms a pore structure that is much finer (e.g., at least an order of magnitude and often two or three orders of magnitude smaller) than, the pores of the foam. Typical powder dimensions are in the range of less than 1 to 50 micrometers.

In some preferred embodiments, the pores of a foam having a density in the range of about 5% to about 15% theoretical density, and about 10 to about 150 pores per linear inch, are impregnated with a powder that is orders of magnitude smaller than the pores of the foam per se and that has anti-corrosive properties at least equal to those of the foam. The foam, which typically has a thickness in the range of about 0.020 to about 0.250 inches, may be in the form of a sheet, or it may be manufactured in the shape of a tube or other regular shape of engineering interest. Because of nickel's corrosion-resistive properties, nickel (or nickel alloy) foams and powders are often preferred, and the nickel powder is typically filamentary. The composite media typically has a density of about 20–70% of theoretical density and the pores formed by the powder are on the order of 1 micrometer or smaller in size. For high efficiency filtration, the composite media may include a layer of sintered powder overlying a foam (with powder in the pores of the foam) core and, when a ductile (e.g., a metal) foam is employed, the foam will have been compressed to a fraction of its original thickness so that the resulting composite media has a total thickness that is substantially the same as (or thinner than) the original thickness of the foam per se. For liquid filtration, a thinner, e.g., about 0.010 inches, and more porous composite media is often desirable.

In one preferred practice, the composite media is made by filling the pores of a foam sheet with either dry powder or a powder slurry, if the foam is ductile (e.g., metal) cold pressing or rolling the filled structure to produce a "green" form of the desired "green" density, and then sintering. In a second practice, a cylindrical ductile metal foam sheet is placed coaxially around a mandrel and then is in turn surrounded by an elastomeric mold (or, alternatively, a cylindrical form sheet is placed around a hollow cylindrical elastomeric mold and in turn is surrounded by a cylindrical exterior mandrel), the annular spaces (i) between the mandrel and the foam cylinder and/or (ii) between the foam cylinder and the mold are filled with powder to impregnate the pores of the foam, pressure is applied to the mold to compress and densify the powder and foam, and the compressed "green" powder-filled foam is then sintered. In either practice, a layer or "skin" of sintered powder having a thickness that may be a substantial percentage (e.g., up to about 70%) of the overall thickness of the composite media may be provided on at least one surface of the foam. In both processes, the forming/pressing compresses the thickness (e.g., wall thickness) of a ductile foam, and increases the density of the green structure.

Other objects, features and advantages will become apparent from the following detailed description of embodiments of the invention, taken together with the attached drawings.

DETAILED DESCRIPTION

Figure 1:
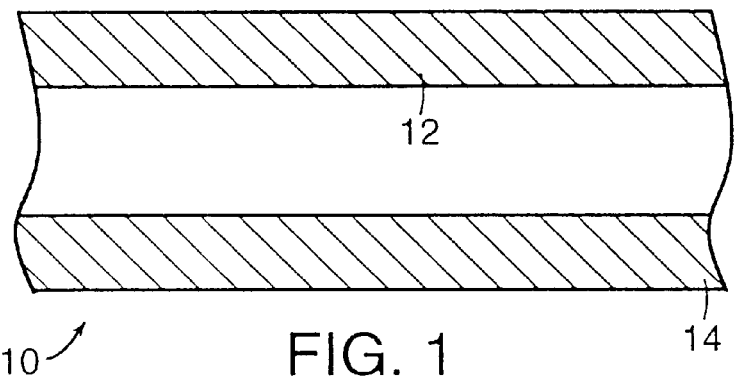
FIG. 1 is a longitudinal sectional view of a tubular porous element embodying the present invention.

Referring now to FIG. 1, a composite porous tubular element, generally designated 10, comprises an open-pore foam (e.g., a pliable or ductile nickel foam of the type sold by INCO under the tradename INCOFOAM) which has been wrapped into a cylinder (e.g., by folding a foam sheet around a tube or rolling a strip over a tube mandrel to make a helical tube), with the adjacent edges of the foam locked in place by butting, overlapping or welding. As indicated, the cylindrical wall of the tubular element 10 includes an inner portion, generally designated 12, comprising the foam cylinder with its pores filled with sintered powder, and an outer cylindrical layer 14 of sintered powder. In the element of FIG. 1, the powder used both to fill the pores of the foam and to form layer 14 is a filamentary powder of the type sold by INCO under the trade designation T255. As will be apparent, a wide range of other foams (e.g., other metal foams, ceramic foams and aerogel foams) and powders (e.g., filamentary or spherical powders, other nickel powders such as INCO T210, powders of stainless steel, titanium, zirconium or other metals, and ceramic powders) can also be employed. The pore structure formed by a sintered powder depends largely on the size of (and is typically similar to the size) of the powder itself, and the powder used in making composite element 10 typically has a size that is orders of magnitude smaller than the original (i.e., prior to filling with powder or other processing) size of the pores of the foam itself.

Figure 2:
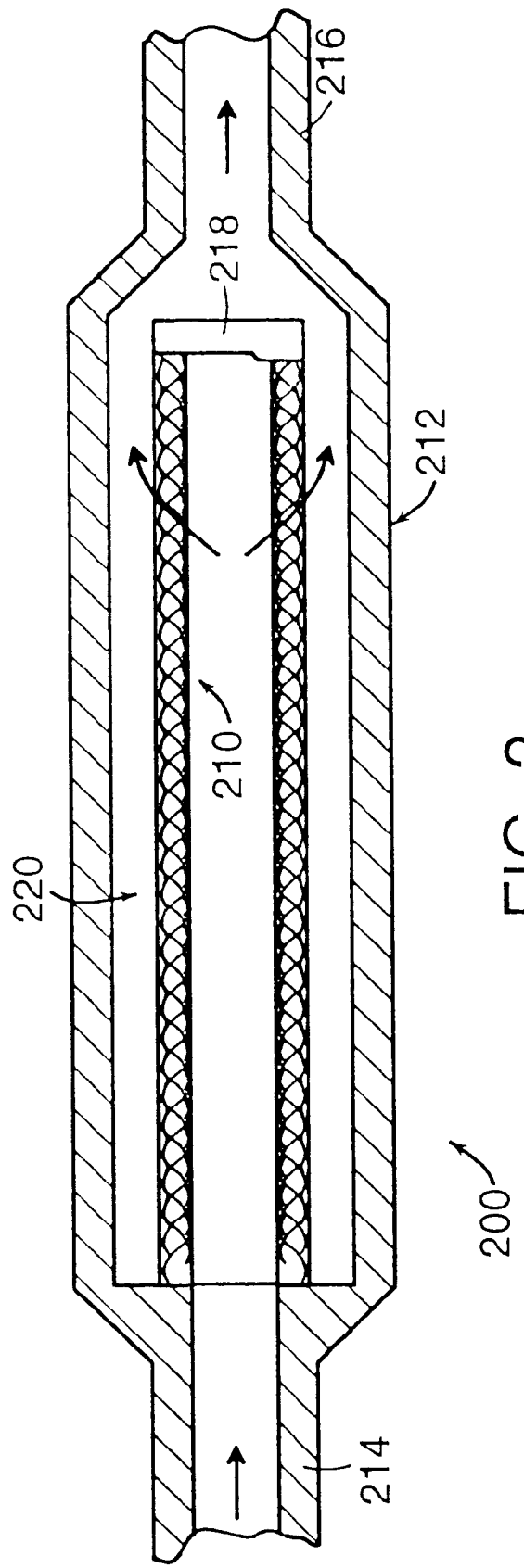
FIG. 2 is a sectional view of a filter including an element similar to that of the element of FIG. 1.

FIG. 2 illustrates a filter, generally designated 200, including another tubular filtration element 210, made in accord with the present invention and substantially similar to the element 10 of FIG. 1, mounted within a housing generally designated 212. One end of filtration element 210 is welded to the end of housing 212 adjacent inlet 214. The other end of the filtration element 210 is spaced from the end of housing 212 adjacent outlet 216 and is closed by an end cap 218. An annular cavity 220 surrounds filtration element 212, within the cylindrical wall 222 of housing 212, and communicates with outlet 216. As illustrated in FIG. 2, flow enters the filter through inlet 214, is introduced into the bore of tubular element 210, flows generally radially through the cylindrical wall 222 of the tubular element into annular cavity 220, and then exits the filter through outlet 216; it will be evident that the direction of flow could also be reversed. As discussed above with reference to element 10, element 210 comprises a metal foam the pores of which are filled with sintered metal powder.

Figure 3:
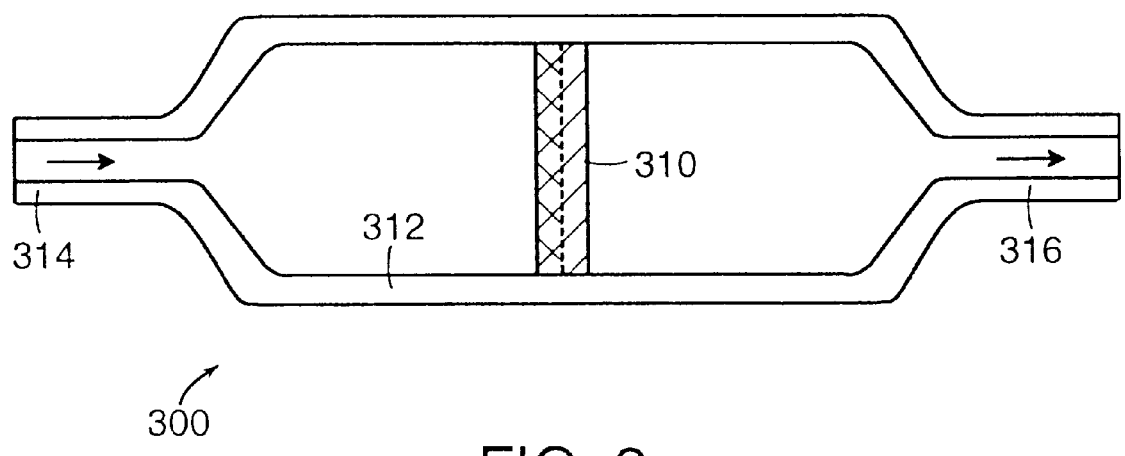
FIG. 3 is a sectional view of a filter including a generally flat element embodying the present invention.

FIG. 3 illustrates a filter, generally designated 300, in which the filtration element 310 is substantially flat rather than tubular. Filtration element 310, which also is made according to the present invention, includes a ceramic foam disk the pores of which are filled with ceramic powder and the assembly then sintered. The filtration element 310 is mounted within a cylindrical housing 312, substantially perpendicular to the axis of the housing and with the periphery of the filtration element is sealed to the interior cylindrical wall of the housing. As shown, an inlet 314 at one end of the housing permits gas to flow into the housing, through filtration element 310, and then out from the housing through outlet 316. Although filtration element 310 is entirely ceramic, it will be appreciated that either of its components, i.e., either the foam or the powder, may be metal or aerogel; e.g., a large pore aerogel may be used as the foam component, while a small pore aerogel (e.g., pores of 10 to 100 nanometer in size) may be used to fill the pores of a ceramic or metal filter.

Figure 4:
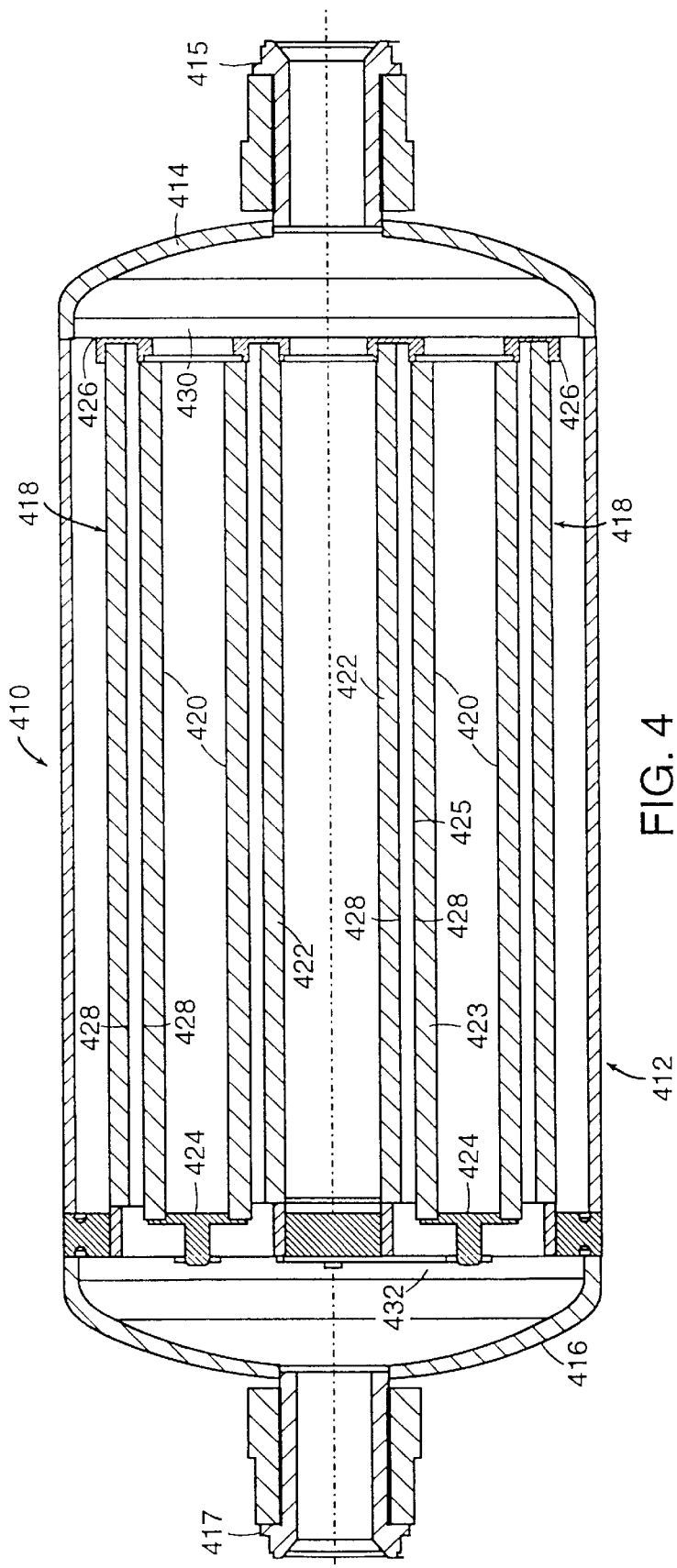
FIG. 4 is a longitudinal sectional view of a high volume filter including a plurality of filtration elements made in accord with the present invention.

FIG. 4 illustrates a filter, generally designated 410, that includes a total of four filtration assemblies, 418, in a housing 412. Housing 412 is closed at its ends by end caps 414, 416, respectively, that provide the inlet 415 to and the outlet 417 from the filter. Each filtration assembly 418 includes a pair of coaxial porous filtration tubes, designated 420 and 422 respectively, a circular end cap 424 closing one end (the outlet end as discussed below) of the inner smaller diameter filtration tube 420, and an annular cap 426 closing the opposite end (the inlet end as discussed below) of the annulus between tubes 420 and 422. The inner ends of the filtration assemblies 418 are supported in an inlet plate 430; the outlet ends are supported in an outlet plate 432.

Inlet plate 430 is constructed to permit inlet flow from inlet cap 414 into (i) the cylindrical bores of the smaller diameter filtration tubes 420 of assemblies 418 and (ii) the region within housing 412 that is exterior to the outer cylindrical surfaces of the larger diameter filtration tubes 422. Inlet plate 430 also closes, and thus prevents inlet flow into, the annulus 428 between the inner tube 420 and the outer tube 422 of each assembly. Outlet plate 432, on the other hand, is constructed to permit flow from the annuli 428 out of the filter 410 through outlet plate 432 and outlet end cap 416, while at the same time blocking flow to and from the cylindrical bores of tubes 420 and the region exterior of the outer cylindrical surfaces of tubes 422. It will thus be apparent that flow through filter 410 passes axially from the inlet, outwardly through the cylindrical walls of inner tubes 420 and inwardly through the cylindrical walls of outer tubes 422 of assemblies 418, and then to the filter outlet.

Each filtration tube 420, 422 of each assembly 418 comprises a porous nickel foam (e.g., a pliable foam of the type sold by INCO under the tradename INCOFOAM) which has been wrapped into a cylinder. In the illustrated filter, the overall thickness of the cylindrical wall of each of tubes 420, 422 is about 0.115 inches. The cylindrical wall of each filtration tube 420 includes a radially inner foam (or foam impregnated with powder) core 423 and a layer or "skin" 425 of sintered nickel powder on its outer cylindrical surface. The pores through the foam portion of the cylindrical walls of each tube are impregnated with sintered nickel filamentary powder (e.g., INCO T255). In the illustrated embodiment, the thickness is skin 425 is about 70% of the total wall thickness of the cylindrical wall of the tube 420, 422. In other embodiments, skin 425 may vary in thickness from as thin as 0.010 inches of less (particularly in circumstances in which a rigid, e.g., ceramic, rather than a compressible, e.g., metal, forms is employed, or in which a low density composite is desired) to as much as about 80% of the overall thickness of the composite foam/powder media. In this respect, it should be noted that the original thicknesses of the metal foams used in making tubes 420, 422 was significantly reduced (e.g., by about 50%) when the green powder-foam composite was compressed before sintering.

It will be recognized that important characteristics of a foam are relatively low density, e.g., typically in the range of 5% to 15% theoretical density and in nearly all circumstances not more than about 35%, and relatively large (compared to a porous sintered structure) interconnected pores, strength and, in the case of a metal foam, ductility. By way of comparison, a conventional porous filter or similar structure made by sintering metal or ceramic powder necessarily has a density of at least about 30% to 35% of theoretical density (e.g., as high as the packing density of the powder itself), the size of the pores themselves is typically less than that of the powder, and the porous structure is relatively weak. Both the low density and the large pore size of a foam result from the facts that a foam is a reticulated intercellular structure in which the open cells that interconnect and form the through-pores are relatively large (e.g., there are 10 to 150, and typically about 50–110 pores per inch, each on the order of 0.01 inch. in diameter) relative to the thickness of the substantially solid and non-porous cell walls (e.g., on the order of 0.001 inch), and that the volume of the cells is considerably more than the volume occupied by the cell walls. For example, the foam made by INCO at Sudbury, Ontario, Canada and sold by INCO under the tradename INCOFOAM typically has a porosity of about 90–95% and about 80–110 pores per inch (cell size of 650 micrometer at 90 ppi). Retec Porous Metals of Chardon, Ohio sells a similar nickel foam products at porosities in the range of 60 to 110 pores per inch; titanium and zirconium foams and available from Ultramet Corp. of Pasadena, Calif.; and Selee Corp. of Hendersonville, N.C. produces ceramic foams of alumina, zirconium and cordierite. In the previously described embodiments using INCOFOAM, the foam from which the filtration tubes are made is about 5% to 10% dense and the pores through the foam are typically about 100 to 200 micrometers in size.

Several procedures for making foams are known. For example, according to one conventional procedure, the cell walls of a nickel foam are made from powder (e.g., fine nickel precipitate made by carbonyl nickel gas) that is then highly sintered so that the walls are fully dense (e.g., about 85% or more theoretical density), are substantially continuous (i.e., non-porous) and have a strength closely approaching that of a cast metal of the same dimensions. Foam is also made by electrolytic or electroless plating the walls of the pores of a blown polymeric foam, and then burning off the polymer. Aerogels, which were first made in 1931 by Steven Kislter of the College of the Pacific, can be prepared utilizing supercritical drying processes to form alkoxy groups or carbon dioxide drying processes to form hydroxyl groups; and can be made various size pore structures. See *Advanced Aerogel Materials for the In-Situ Capture of Gaseous Pollutants*, available from Dr. Yosry Attia of TAASI Laboratory, Columbus, Ohio, and *Aerogel materials for photocatlytic detoxification of cyanide wastes in water*, Journal of Non-Crystalline Solids 186 (1995) 402–107 and the references cited therein. After sintering, they form a rigid structure much like a porous metal.

It will be noted that, largely because of the sintered powder in the foam pores, the composite porous media of the present invention has a considerably greater density and much finer pore structure than does the foam used to make it. The actual density of any particular composite media depends on several things, e.g., the size of the pores of the foam, the size and configuration of the powder employed to fill the pores, the extent to which the pores were filled before pressing and/or sintering, the amount of compression prior to sintering, and the sintering conditions. It will be apparent that spherical powders have a greater packing density than filamentary powders and thus typically provide a greater percentage fill of the foam pores before densification. A typical composite media according to the present invention will have a density in the range of about 20% to about 35% of theoretical density, and the pore structure formed by the sintered powder that fill the foam pores (and in some embodiments forms a skin on the foam surface) will define pores at least one or two orders of magnitude smaller, e.g., typically pore size will be not more than about 2 to 10 micrometers and preferably about 2 micrometers for a composite media intended for gas flow operations and not more than 1 to 100 micrometers and preferably about 1 to 20 micrometers for liquid flow applications.

Figure 5:
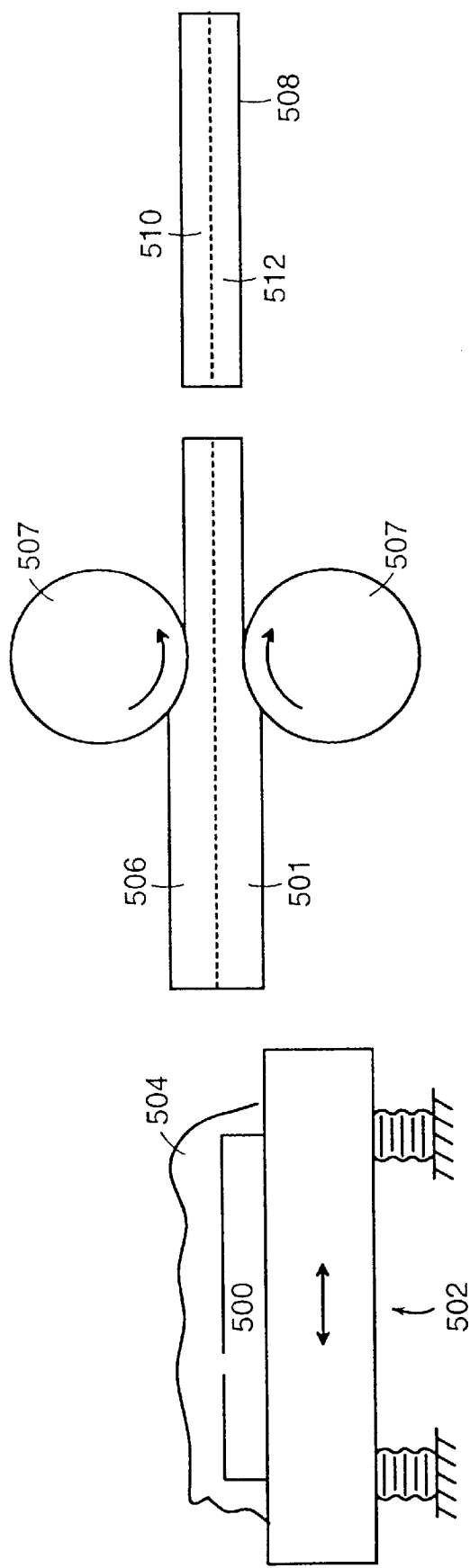
FIG. 5 is a schematic of a vibratory system and a calendering or rolling method for producing flat filtration elements embodying the present invention.

Referring now to FIG. 5, in one procedure for making filtration elements according to the present invention a sheet 500 of open-pore metal foam is placed on a vibratory table 502, the top surface of foam sheet 500 is covered with fine metal powder 504, and sheet 500 with the powder 504 on top of it are vibrated until the pores of the sheet have been substantially filled with the powder. The pore-filled foam sheet 501, with a layer 506 of loose powder on top of it, is then compressed, either by cold pressing or (as shown) by cold rolling through a pair of calendar rolls 507, thereby forming a "green" powder-foam composite 508 having a powdered metal layer 510 on the top of the compressed powder-filled foam 512. If desired, the pore-filled sheet 501 and powder layer 506 may be lightly pre-sintered before compressing. In either event, the applied pressure densifies the powder (and in so doing compresses the foam) and forms the composite structure to the desired green density. The compressed powder-foam composite 508 is then sintered in a suitable environment (e.g., vacuum or a protective environment containing hydrogen, nitrogen or argon) at temperatures that are sufficiently high and for a sufficiently long period of time (e.g., at 1200–1900 degrees F. for between 10 to 60 minutes), to form diffusion bonds between the powder particles on top of the sheet and also between the powder particles within the pores and with the surfaces of the foam.

It will be noted that the amount of pressure used during cold rolling or pressing determines the density (typically in the range of about 20% to about 30%) and porosity of both the cold pressed/rolled "green" composite 508 and the final filtration element/media. Unlike "green" powder structures of similar density, composite 508 is substantially rigid (the rigidity is provided by the foam component) and can be handled with ease during processing. It should also be noted that, during sintering, composite 508 undergoes only limited (typically less than about 5%) shrinkage, as contrasted with the 10%–15% or more shrinkage occasioned during sintering of fine, filamentary or dendritic particle powder structures.

In the procedure of FIG. 5, the pores of the foam sheet 500 are filled with dry powder. Such a binder-free procedure is often preferred when the composite porous element is to be used for high purity applications, particularly to provide devices having ultra-high filtration efficiency and chemical purity for the semiconductor industry. In making composite porous structures for non-high purity applications, the pores of the foam sheet 500 may be filled, and any needed layer 510 on top of the foam provided, by applying the powder as part of a slurry. When a slurry process is used, the slurry is typically about 20% powder and about 80% liquid (e.g. water with a defloculant) by weight. In a slurry process, it is often desirable for the portion of table 502 on which the foam rests to be perforated and to provide a suction/vacuum below to assist in drawing the powder slurry into the foam pores.

Figure 6:
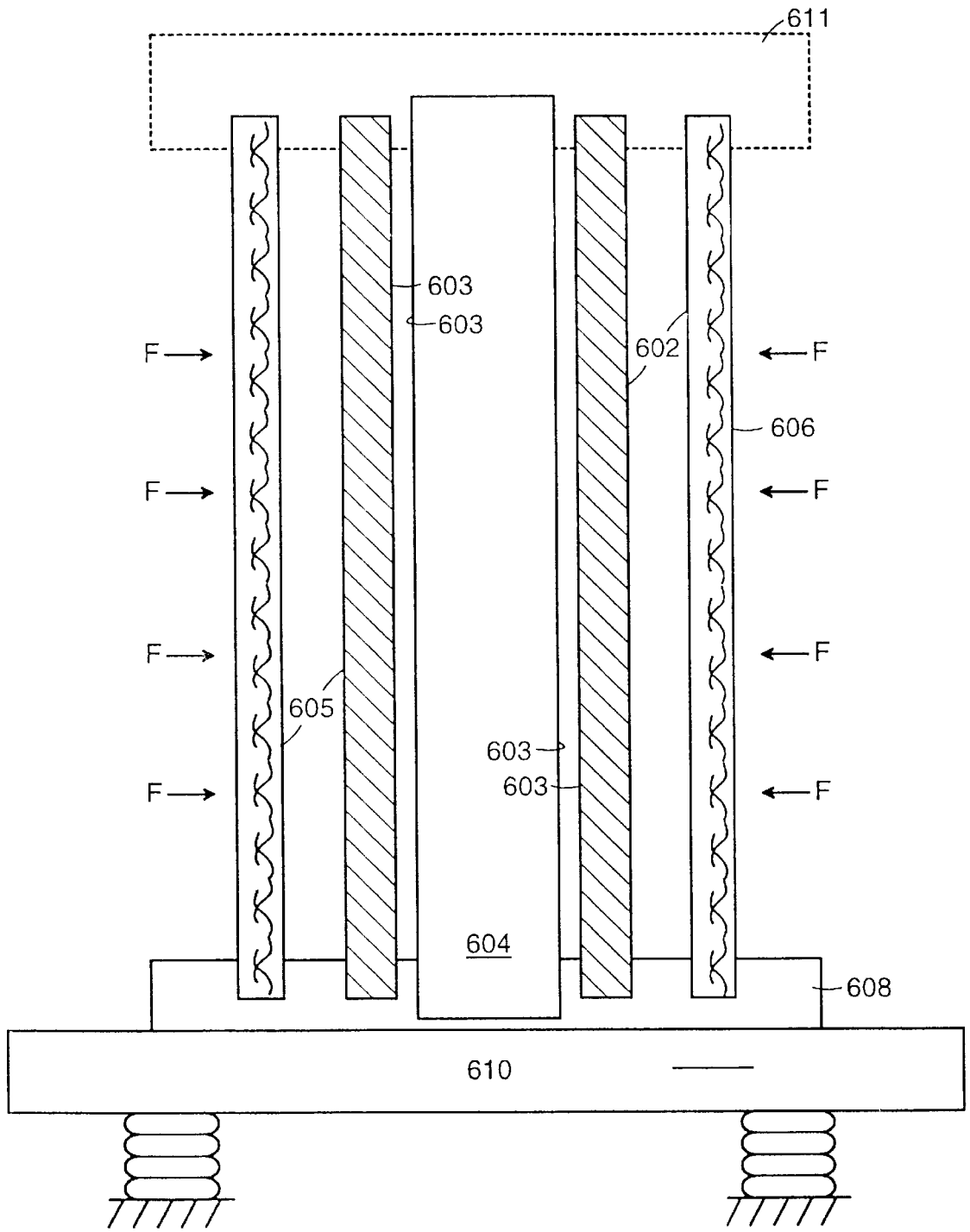
FIG. 6 is a schematic, partially in section, of a system useful for producing tubular filtration elements embodying the present invention.

FIG. 6 schematically illustrates the procedure used to make tubular porous elements such as tubular element 10 of FIG. 1, tubular elements 210 of filter 200 of FIG. 2, and filtration tubes 420, 422 of FIG. 4. As previously indicated, each tube is made by placing a foam cylinder 602 (e.g., a nickel foam cylinder formed from INCOFOAM pliable nickel foam about 0.070 inches (about 1.7 mm) thick and having a density in the range of about 5–10% theoretical) coaxially around a vertically oriented mandrel 604 in such a way as to provide an annular gap 603 between the outer cylindrical surface of the mandrel and the inner cylindrical surface of the foam cylinder. A cylindrical elastomeric (e.g., polyurethane) mold 606 is in turn placed coaxially around cylinder 602 in such a way as to provide a much smaller annular gap 605 between the mold 606 and the outer cylindrical surface of cylinder 602. A bottom cap 608 closes the lower end of the assembly and coaxially fixes mandrel 604, foam cylinder 602 and elastomeric mold 606 relative to each other.

This open-at-the top assembly is placed on a vibratory table 610, and metal powder (e.g., INCO T255 or T210 nickel powder) is poured into the annuli 603, 605 while the table and assembly are being vibrated to both fill the pores of the foam cylinder 602 and the two annuli with powder. When the pores and annuli have been filled, the assembly is then closed at its top with a top cap 611 (shown in phantom) substantially identical to bottom cap 608, and the sealed assembly is then placed in the fluid tank of a conventional hydraulic isostatic press. The fluid in the press is then pressurized, e.g. to a pressure in the range of 500–20,000 psi, and for INCO nickel T255 powder preferably about 1000 psi, for a period of about 30 seconds to 5 minutes, to compress the foam tube/powder assembly into a "green" form. As will be evident, and as schematically shown in FIG. 6, the hydraulic pressure force F is applied radially inwardly, and the applied pressure compresses the powder in annulus 605 to form a pressed powder layer on the exterior cylindrical surface, and radially compresses (reducing both the wall thickness and inner diameter and increasing the density) of the foam cylinder 602. Radial compression of the foam cylinder 602 in turn compresses any powder in annulus 603 and thus may also form a powder layer on the interior cylindrical surface. The compressed composite so formed is then sintered at 1330 deg. F. for 30 minutes in vacuum.

Since filtration tubes 420 and 422 are of different diameter, it will be apparent that the foam cylinders from which they are constructed are of different diameter also. Also, although the wall thicknesses of the cylinders may be the same, that the dimensions of the system, for example, the mandrel 604 and the elastomeric mold 606 used in the system of FIG. 6, will necessarily be changed as required. It should also be noted that the widths of the annuli 603, 605, and the pressures and sintering conditions, will vary depending on, among other things, the type of powder employed and the density and pore structure of the final composite media. By way of example, in the manufacture of filtration tube 420, the foam cylinder (wall thickness about 0.070 in.) used to make the filtration tube fits closely around mandrel 606 (e.g., the width of annulus 603 is not more than about 0.005 in.), but the outer diameter of the foam cylinder is such that annulus 605 is considerably less than the inner diameter of elastomeric mold 606 so that annulus 505 is much wider, e.g., about 0.17 in. After the powder and foam are compressed, i.e., when the composite is in its green form, the overall wall thickness of the composite is about 0.140 inches (i.e., about twice the original wall thickness of the uncompressed foam), the compressed powder "skin" forming the exterior cylindrical surface of the composite is about 0.100 inches thick, and inner foam "core" of the composite has been reduced to about half its original thickness.

Depending on the application for which the composite media is intended, "skins" of very different thicknesses may be provided at either the inside or outside surfaces of the composite (or at both). When, for example, a skin is to be provided on the inside cylindrical surface of the tube, it is usually convenient to place a cylindrical mandrel outside and pressure to the interior using an interior cylindrical bladder. Similarly, the density of both the powder-filled foam and that of any skin (and the extent to which the density is increased during pressing) can be varied as desired, e.g., by varying the type of powder used and the pressure applied to form the "green structure." Spherical powders, for example, will typically more fully fill the pores of the foam prior to any compression, with the result that the foam will be more dense and often will provide a greater fraction of the overall thickness of the final composite media.

As is well known, the specified filtration efficiency of a filter depends on the flux (flow rate per unit area) at which the efficiency is measured. In the embodiment of FIG. 4, filtration tubes 420, 422 provide a flow rate of 15 slpm per square inch at a pressure differential ranging from 8 to 12 psi, with lower pressure differential being preferred; and accomplish 9 LRV filtration efficiency (i.e., remove not less than 99.9999999% of particulate matter at the most penetrating particle size) at this rate of flow. Lower efficiencies, e.g., 6 LRV, are provided at higher flow rates and, as those skilled in the art will recognize, either higher or lower efficiencies at any given flow can be accomplished by varying the wall thicknesses or porous structures of the composite media filtration tubes.

The following examples illustrate aspects of the present invention.

EXAMPLE I

To determine the reduction in shrinkage during sintering of a composite filtration element according to the present invention as compared to a conventional sintered powdered metal element, tubes of both types were constructed, measured in the green form, sintered under identical conditions, and then measured after sintering. In both sets of tubes the metal powder employed was Nickel T255 powder from INCO. The composites of the present invention were made using Nickel foam having 90 pores per linear inch and 0.070 in. thick, also from INCO. Both tubes were made using a central mandrel having a diameter of 0.42 inches, a surrounding elastomeric mold having an internal diameter of 0.690 inches. The conventional sintered metal element was formed by filling the annulus between the central mandrel with powder, compressing at 600 psi, and then sintering the resulting green cylinder in vacuum for 30 minutes at 1330 deg. F. The composite tubes of the present invention were formed by placing the foam Nickel cylinder in the annulus, impregnating the pores of the foam with powder as previously described, and compressing and the sintering the resulting green structure in the same manner. The inner and outer diameters of the resulting structures, both in the green form and after sintering, are as shown below, together with the weights of the two structures.

| Porous Tube | O.D. (inch) Green | O.D. (inch) Sintered | I.D. (inch) Green | I.D. (inch) Sintered | weight (gm) |
|---|---|---|---|---|---|
| with foam | 0.565 | 0.550 | 0.416 | 0.416 | 24.3 |
| without foam | 0.585 | 0.501 | 0.420 | 0.354 | 25.9 |

As will be evident, the inner and outer diameters of nickel foam/powder composite of the present invention shrank, respectively, by less than 3% and less than 1%, while those of the conventional powder structure shrank some 15%. It should be noted that, in the composite of the present invention, most of the overall shrinkage was in the powder layer or "skin" surrounding the foam core. To a significant extent, the reduction in overall shrinkage is the result of the restraint provided by the rigid foam. During sintering, the powder particles in the "green" structure form solid state bonds with the foam walls and between particles, resulting in a high porosity structure reinforced by the foam.

EXAMPLE II

Composite nickel foam/powder tubular composites according to the present invention were made as in Example I, except that the pressure employed to form the green structure was 1000 psi. Each tubular composite had a length, OD (outer diameter) and wall thickness as shown below. As will be evident, each composite provided an LRV of 9.8 or greater at a pressure drop in the range of 9.6 to 11.5 psi.

| Wall thickness (inch) | OD (inch) | Flow (SLPM/ L (inch) | Delta P (SLPM) | flux (SLPM/ sq. in.) | (Psi) | LRV |
|---|---|---|---|---|---|---|
| 0.1 | 0.6 | 2 | 50 | 13.4 | 10.5 | >9.95 |
| 0.1 | 0.6 | 2 | 52 | 14.6 | 9.6 | >9.89 |
| 0.1 | 0.6 | 2 | 55 | 14.8 | 11.5 | 9.8 |

EXAMPLE III

Composite nickel foam/powder tubular composites according to the present invention were made as in Example I, except that the pressure used to form the green structure was varied. The resulting variation in density, and in pore size as indicated by bubble point, was as shown in the table below.

| Pressing Pressure (Psi) | o.d. (inch) | I.d. (inch) | wall thick (inch) | density (g/cc) | % density | bubble pt. (inches of Hg) | flow (SLPM) | flux (slpm. sq. in.) | delta P (Psi) |
|---|---|---|---|---|---|---|---|---|---|
| 1000 | 0.985 | 0.785 | 0.100 | 2.8 | 32% | 3.8 | 100 | 3.2 | 2 |
| 2500 | 0.943 | 0.78 | 0.082 | 3.3 | 38% | 6.3 | 63 | 2.0 | 2 |
| 5000 | 0.925 | 0.785 | 0.070 | 3.9 | 44% | 7.6 | 40.6 | 1.3 | 2 |
| 10000 | 0.905 | 0.78 | 0.063 | 4.8 | 54% | 7.3 | 23 | 0.7 | 2 |
| 20000 | 0.9 | 0.78 | 0.060 | 5.0 | 56% | 12.9 | 9.5 | 0.4 | 2 |

As is well-recognized in the art, bubble point pressure typically indicates the largest pore(s) in the material being tested; and a bubble point of 12.9 inches of mercury typically indicates a largest pore size of about 0.5 micrometers.

EXAMPLE IV

A ceramic foam cylinder is placed coaxially around a horizontal perforated mandrel. A slurry containing, by weight, 20% stainless steel (generally spherical, less than one micrometer in diameter) powder and 80% water-based binder, is dripped over the mandrel while the mandrel (with the foam on it) is rotated slowly about its horizontal axis. A longitudinally-extending doctor blade wipes the outer cylindrical surface of the foam slightly ahead of the region to which the slurry is applied. Suction is provided to the interior of the mandrel. After the pores of the foam have been filled with powder (as determined by the increase in weight), the foam and powder are baked to drive off the binder, and sintered. The resulting composite structure will have a density several times that of the foam per se, and the powder in the pores of the foam will define a porous structure in which the average pore size is more than two orders of magnitude smaller than the pores of the foam.

EXAMPLE V

The pores of a metal foam sheet (e.g., a sheet of foam obtained from Retec Porous Metals having 80 pores per inch) are filled with an aerogel. As formed in the pores of the metal foam using a sol-gel process in which an alcohol solution of a metal alkoxide is first hydrolyzed to form a sol and then polymerized to form a gel, the aerogel will be highly porous (e.g., have a density of about 5% and form pores having a mean diameter of about 20 nanometers). The alcohol is removed from the pores of the gel by supercritical drying, e.g., at temperatures of about 240 degrees F. and pressures of about 6.36 bars, to minimize shrinking and cracking.

EXAMPLE VI

An aerogel sheet is formed generally according to the process described in Example V, except that, after supercritical drying, the pores in the aerogel sheet will have a mean diameter on the order of one. The pores of the aerogel sheet thus produced can be filled with a very fine, e.g., less than 0.1 micrometer metal powder, and sintered at low temperature to produce a composite porous element.

OTHER EMBODIMENTS

It will be apparent from the above-described preferred embodiments that the foam and powder used to form the composite porous media of the present invention may be made of a number of different materials. Although nickel, stainless steel or ceramic foam and nickel, stainless steel or ceramic powders are often preferred because they can be used in a wide range of applications, it may, for example, be desirable to use nickel-alloy (e.g., 80% nickel—20% chromium, or nickel-chromium-aluminum) foam and powders (such as those available from Sumitomo Metal Products Co.) for use in highly corrosive environments, and titanium or zirconium foam-powder structures are particularly useful as high efficiency filters or as wicks in heat pumps.

Similarly, and because the foam is formable and gives the composite high green and fracture strength, the composite porous media of the present invention may be provided in a wide range of engineering shapes.

The media of the present invention may also be formed using a range of processes in addition to those already described. For example, cylindrical porous tubes with the principal sintered metal "skin" forming the interior cylindrical surface may be formed by placing a elastomeric mold inside, rather than outside, a foam tube. Dual density filtration media may be made using a variety of procedures, such as forming a first sintered metal skin on a sheet, and then rolling the sheet into a cylindrical tube and forming a second sintered skin either over the first, or on the opposite cylindrical surface of the tube; or by applying a second layer to either a flat sheet or cylindrical structure after the first "green" structure has been formed.

Flat filtration elements, such as those made by placing dry metal powder on a foam sheet as described above or by placing a metal slurry on a foam sheet and impregnating the slurry into the pores of the sheet by, e.g. vibration or by vacuum applied to the opposite side of the sheet, may be used as flat discs, may be made into corrugated or pleated configurations, or may be rolled into cylindrical or conical (or frusto-conical) form. The elements may be made from individual foam sheets, as described above, or in a continuous procedure in which a long foam strip is advanced through a series of successful stations, e.g., a chamber containing a dry powder or slurry for filling the foam pores, followed by a calendering roll, a baking furnace, a pre-sintering furnace, additional calendering rolls as needed, a final sintering furnace, and a take-up mandrel on which the sintered composite porous media is wound as a continuous strip.

Foams may be impregnated from one side only leaving the other side of the foam empty. This may be accomplished by, for example, partially filling a portion of foam with wax from one side, impregnating powder from the other side either dry or using a slurry, and then removing the wax by heating above the wax melting point. Subsequently the composite will be heated at higher temperatures to drive off slurry binders, and it eventually will be sintered. The composite can be calendered and re-sintered to achieve higher strength.

These and other embodiments will be within the scope of the following claims.

What is claimed is:

1. A composite porous media comprising:

a foam having a multiplicity of through-pores; and, sintered powder impregnating the pores of said foam, said foam being a metal foam and said media including a layer of sintered metal powder having a thickness in the range of 50% to about 75% of the overall thickness of said media defining a surface of said media.

2. The composite porous media of claim 1 wherein the density of said media is in the range of about 20% to about 35% of theoretical density.

3. A composite porous media comprising:

a foam having a multiplicity of through-pores; and, sintered powder impregnating the pores of said foam, the foam having in the range of 10 to 150 pores per inch, and the sintered powder in the pores providing a porous structure having pores with a nominal size in the range of about 100 micrometers to about 0.1 micrometers.

4. The composite porous media of claim 3 wherein said porous structure has pores with a nominal size in the range of about 0.1 to about 10 micrometeres.

5. A composite porous media comprising:

a foam having a multiplicity of through-pores and a density in the range of about 5% to about 25% of theoretical density; and, sintered powder impregnating the pores of said foam, said media having a density in the range of about 20% to about 35% of theoretical density, and each of said foam and said powder being metal.

6. The composite porous media of claim 5 wherein each of said metal and said metal powder is one of stainless steel, nickel, titanium, zirconium and a nickel alloy.

7. A composite porous media comprising:

a foam having a multiplicity of through-pores and a density in the range of about 5% to about 25% of theoretical density; and, sintered powder impregnating the pores of said foam, said media having a density in the range of about 20% to about 35% of theoretical density, said media including a layer of said sintered powder defining a surface of said media, and said layer having a thickness in the range of about 10% to about 50% of the thickness of said media.

8. The composite porous media of claim 7 wherein said porous media is in the form of a cylinder and said layer is sintered metal powder and defines at least one of the inner and outer cylindrical surfaces of said cylinder.

9. A filter comprising:

a housing, and the media of claim 3 or claim 5 within said housing, said filter having a filtration efficiency not less than 6 log reduction value at a flow rate of 15 slpm per square inch.

10. The filter of claim 9 wherein said filtration efficiency is not less than 9 log reduction value.

11. The filter of claim 9 wherein said media comprises metal or ceramic or aerogel foam, and said three dimensional porous structure comprises sintered metal or ceramic powder.

12. The filter of claim 11 wherein said media comprises a layer of said sintered powder defining a surface of said media and having a thickness in the range of about 10% to about 75% of the overall thickness of said media.

\* \* \* \* \*